(12) United States Patent
Hirata

(10) Patent No.: US 6,654,140 B1
(45) Date of Patent: Nov. 25, 2003

(54) IMAGE FORMING APPARATUS THAT PERMITS EASY JOB REGISTRATION

(75) Inventor: Manabu Hirata, Okazaki (JP)

(73) Assignee: Minolta Co., Ltd., Osaka (JP)

( * ) Notice: Subject to any disclaimer, the term of this patent is extended or adjusted under 35 U.S.C. 154(b) by 537 days.

(21) Appl. No.: 09/164,583

(22) Filed: Oct. 1, 1998

(30) Foreign Application Priority Data

Oct. 3, 1997 (JP) .............................................. 9-271198

(51) Int. Cl.$^7$ .............................................. G06K 15/00
(52) U.S. Cl. ...................... 358/1.18; 358/401; 358/1.15
(58) Field of Search ................................ 358/401, 400, 358/296, 1.18, 1.15, 1.1

(56) References Cited

U.S. PATENT DOCUMENTS

| | | | | |
|---|---|---|---|---|
| 5,206,735 A | * | 4/1993 | Gauronski et al. ........... | 358/296 |
| 5,243,381 A |   | 9/1993 | Hube ......................... | 355/204 |
| 5,287,434 A | * | 2/1994 | Bain .......................... | 395/101 |
| 5,689,625 A | * | 11/1997 | Austin ........................ | 395/114 |
| 5,940,582 A | * | 8/1999 | Akabori ...................... | 395/112 |

FOREIGN PATENT DOCUMENTS

| | | | | |
|---|---|---|---|---|
| JP | 4-321376 | 11/1992 | ............ | H04N/1/40 |
| JP | 5-122477 | 5/1998 | | |

* cited by examiner

Primary Examiner—Jerome Grant, II
(74) Attorney, Agent, or Firm—McDermott, Will & Emery

(57) ABSTRACT

The copying machine of this embodiment has a first registration method and second registration method. The first registration method in which copy modes such as the number of copies, magnification, copy darkness and need for collation are set using an operation panel in the same way as in conventional copying machines to register a job. The second registration method in which a desired job is selected from the job list displayed on the liquid crystal panel when the job list key is pressed, the copy modes and image of the selected job are revised, and the revised job is registered as a new job, or the selected job is registered as a new job without undergoing revision.

18 Claims, 13 Drawing Sheets

Fig. 6(a)

| Region | JOB Number JN | Page Number PN | Front Link | Back Link | Additional Information |
|---|---|---|---|---|---|
| 00 | 1 | 1 | 00 | 01 | |
| 01 | 1 | 1 | 01 | FF | |
| 02 | 1 | 2 | 00 | 03 | |
| 03 | 1 | 2 | 03 | FF | |
| .. | .. | .. | | | |
| 1000 | 25 | 1 | 00 | 01 | |
| 1001 | 25 | 1 | 01 | FF | |
| 1002 | 25 | 2 | 00 | 03 | |
| 1003 | 25 | 2 | 03 | FF | |

Fig. 6(b)

| | |
|---|---|
| 0 | Compressed Data Of Page Number 1 Of JOB Number 1 |
| 32K | Compressed Data Of Page Number 1 Of JOB Number 1 |
| 64K | Compressed Data Of Page Number 2 Of JOB Number 1 |
| 96K | Compressed Data Of Page Number 2 Of JOB Number 1 |
| 128K | ...... |

# IMAGE FORMING APPARATUS THAT PERMITS EASY JOB REGISTRATION

This application is based on application No. 9-271198 filed in Japan, the contents of which is hereby incorporated by reference.

BACKGROUND OF THE INVENTION

1. Field of the Invention

The present invention pertains to an image forming apparatus such as a digital copying machine, and more particularly, to an image forming apparatus in which multiple jobs can be registered.

2. Description of the Related Art

Copying machines in which multiple jobs can be registered have been developed in recent years. One such copying machine is the image processor disclosed in Japanese Laid-Open Patent Application Hei 4-321376. This image processor performs image processing using sheet recognition information by means of a specific mark or symbol as well as by means of a job control sheet in which the job attribute information defining the operation instructions for the machine is described. Where the job contents are to be revised by means of this image processor, an original document which is overlapped onto a job control sheet is set in the auto document feeder and the information on the job control sheet is read by the image reader. The revision key or addition key on the control panel is then selected and the revision or additional information regarding the job contents is input. The new information is registered when the register key is input.

Some of the conventional copying machines are equipped with a copy mode program function in which multiple sets of copy modes are registered in advance by the user in accordance with the conditions of use.

However, using the image processor disclosed in Japanese Laid-Open Patent Application Hei 4-321376 described above, when a new job is to be registered, it is necessary to read the information on the job control sheet by means of the image reader. Therefore, when registering a new job by revising the contents of the job that is already registered, the information on the job control sheet must be read once again by the image reader, which makes the operation inconvenient. Another problem is that where another original document is being read, the user must wait until the image reader becomes available.

In conventional copying machines, on the other hand, even when copying is to be performed using the copy modes that are identical to those of the job previously set, while the copying machine still remembers the last set of copy modes, it cannot recall the copy modes that were used for a job that was several jobs in the past. Consequently, where additional copying is to be performed using the same job contents as previously set, it is necessary to set the copy modes from the start. In addition, in the copying machine equipped with the copy mode program function, while it is possible to call up the registered sets of copy modes and perform setting, selection is limited to those sets of copy modes that are already registered. This entails the problem that setting must be carried out for any other sets of copy modes.

SUMMARY OF THE INVENTION

The present invention was created to resolve these problems. Its object is to provide a convenient image forming apparatus that, where the job contents that are to be newly registered are identical or similar to the contents of a job that is already registered, said job can be newly registered in a simple fashion.

In order to attain said object, first, the image forming apparatus of the present invention comprises an input means to input image data, a first registering means to associate operation modes with said image data and register them together as a job, a selecting means to select a job from among the jobs registered by said first registering means, a revising means to revise the selected job, a second registering means to register said revised job as a new job, and an output means to execute output of the jobs registered by said first registering means and said second registering means.

Said revising means revises the operation modes of a selected job or replaces the image data of a selected job with the image data that is newly input, for example.

Secondly, the image forming apparatus of the present invention also comprises an input means to input image data, a first registering means to associate operation modes with said image data and register them together as a job, a selecting means to select a job from among the jobs registered by said first registering means, a second registering means to register the selected job as a new job, and an output means that executes output of the jobs registered by said first registering means and said second registering means.

Thirdly, the image forming apparatus of the present invention further comprises a reading means to read the image of the original document, a first registering means to associate operation modes with said image data and register them together as a job, a selecting means to select a job from among the jobs registered by said first registering means, a display means to display the operation modes of the job selected by said selecting means, a means to revise the operation modes that are displayed, a second registering means to associate the revised operation modes with the image data newly read by said reading means and register them together as a new job, and an output means to execute output of the image data of the jobs registered by said first registering means and said second registering means based on the operation modes.

The registration by the user may be simplified and the time needed for the operation of the machine may be reduced via the characteristics described above.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

FIG. 6 is a drawing showing the relationship between a management table MT1 and a code memory 306.

DESCRIPTION OF THE PREFERRED EMBODIMENTS

Figure 1:
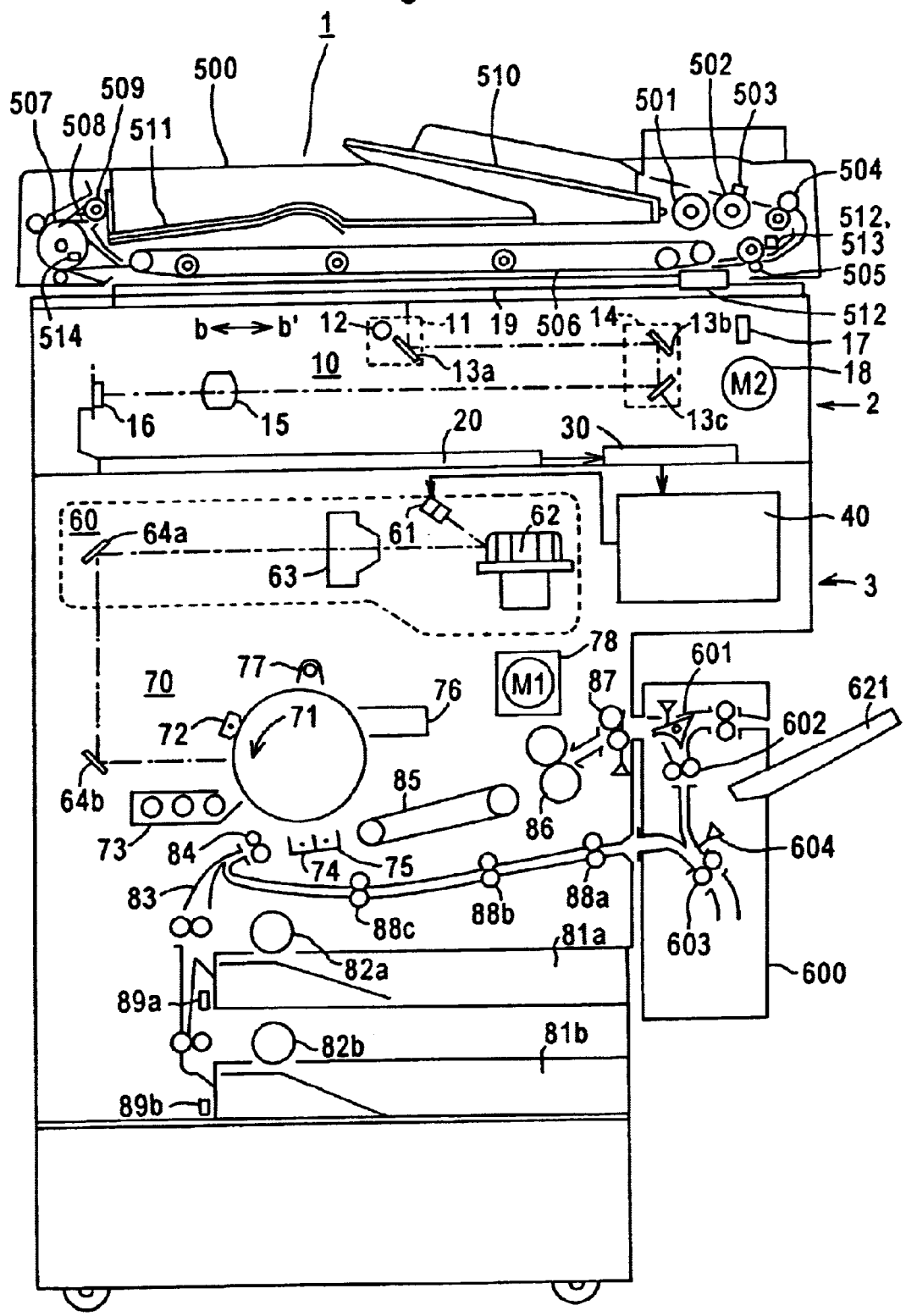
FIG. 1 is a drawing showing the entire construction of the copying machine of an embodiment of the present invention.

FIG. 1 is a drawing showing the entire construction of the copying machine of an embodiment of the present invention. With reference to FIG. 1, the copying machine 1 includes a scanning system 10 to read the original document and convert the image into image signals, an image signal processor 20 to process the image signals sent from the scanning system 10, a memory unit 30 to store the image data sent from the image signal processor 20 and send it to the print processor 40, a print processor 40 to drive a semiconductor laser 61 based on the image data sent from the memory unit 30, a laser optical system 60 to guide the laser beam from the semiconductor laser 61 to the exposure position on the photoreceptor drum 71, an image forming system to develop the latent image formed on the photoreceptor drum 71 by means of the laser beam and to form an image on the recording paper, an operation panel not shown in the drawing that is located on the top surface of the copying machine 1, and an original document feeder 500 to feed the original document to the reading unit 2 and to eject the original document as to which reading has been completed from the reading position, or to flip it over if necessary.

The reading unit 2 includes the scanning system 10 and the image signal processor 20, while the printer 3 includes the print processor 40, the laser optical system 60 and the image forming system 70.

The reading unit 2 reads the image of an original document that is placed on the platen glass 19 with the surface to be read facing down, and generates image data corresponding to each pixel of the image of the original document. The first scanner 11 including an exposure lamp 12 and a first mirror 13a, and the second scanner 14 including a second mirror 13b and a third mirror 13c are moved in the directions of the arrows b and b' (secondary scanning directions) by being driven by the scan motor 18. The light from the exposure lamp 12 is reflected off of the original document on the platen glass 19, and irradiates the line sensor 16 via the mirrors 13a, 13b and 13c and the converging lens 15. The line sensor 16 comprises a number of photoelectric conversion elements aligned in a line that runs perpendicular to the paper on which FIG. 1 is drawn (main scanning directions). It reads the image at 400 dpi, for example, and outputs image data corresponding to each pixel. As described above, the first scanner 11 and the second scanner 14 move in the directions of the arrows b and b', which enables the line sensor 16 to perform the secondary scanning of the image of the original document. The sensor 17 detects that the first scanner 11 is at the home position.

The image data output from the line sensor 16 is processed by the image signal processor 20 and then is sent to the memory unit 30. The memory unit 30 compresses the image data received from the image signal processor 20 and stores it. It then expands the compressed image data when printing is to be performed and sends it to the printer 3. At that time, rotation or editing is performed if necessary. The image signal processor 20 and the memory unit 30 will be described in detail below.

The print processor 40 in the printer 3 controls the laser optical system 60 based on the image data received from the memory unit 30. The laser optical system 60 includes a semiconductor laser 61 that emits the laser beam that is modulated (on/off) by the print processor 40, a polygon mirror 62 that reflects the laser beam emitted from the semiconductor laser 61 such that it will scan the photoreceptor drum 71, an fθ lens 63, and mirrors 64a and 64b.

Around the photoreceptor drum 71 that is rotated are located, in the direction of its rotation, a charger 72 to charge the photoreceptor, a developing unit 73 to develop the latent image formed through the exposure, a transfer charger 74 to transfer the image onto the recording paper, a separation charger 75 to separate the recording paper from the photoreceptor drum 71, a cleaner 76 to remove the toner remaining on the photoreceptor drum 71, and an eraser lamp 77 to remove the potential remaining on the photoreceptor. They form a toner image and transfer it onto the recording paper using the public domain electrophotographic process. The recording paper is conveyed by means of a paper supply roller 82a or 82b to the transfer position at which the transfer charger 74 and the photoreceptor drum 71 face each other from either a paper supply cassette 81a or 81b or, via the paper conveyance path 83 and the timing roller 84. The recording paper onto which the toner image has been transferred at the transfer position is ejected onto the paper eject tray 621 via the conveyor belt 85, the fuser 86 and the eject roller 87. The eject roller 87 and the photoreceptor drum 71 are driven by means of a main motor 78. Near the paper supply cassettes 81a and 81b are located remaining paper detection sensors 89a and 89b that detect the remaining amount of the paper housed in each cassette.

The original document feeder 500 automatically feeds the original document set on the original document supply tray 510 to the reading position on the platen glass 19. After the original document image has been converted into image signals by the scanning system 10, the original document feeder 500 ejects the original document from the reading position to the original document eject unit 511.

Ordinarily, an original document comprising a single sheet or multiple sheets is set in the original document supply tray 510 with the surfaces to be read facing upward, and the side regulator plate is adjusted to the width of the original document. The original document is conveyed by the paper supply roller 501 starting with the bottom sheet, and while being flattened by the flattening roller 502 and the flattening pad 503, the original document is sent to the reading position sheet by sheet. A sheet of the original document thus sent passes through the intermediate rollers 504, and after it is detected by a resist sensor 512 and a width size sensor 513, any misalignment of the sheet is corrected by a resist roller 505. Immediately after the trailing edge of the sheet of the original document has passed the left end of an original document scale 512, the original document conveyor belt 506 travels backward slightly and then stops.

Through this operation, the right corner of the sheet of the original document comes into contact with the edge of the original scale 512 and the sheet of the original document is set on the platen glass 19 at the reading position. When this happens, the leading edge of the next sheet has already reached the resist roller 505, such that the conveyance time for the next sheet may be reduced.

When the sheet of the original document is placed on the platen glass 19 at the reading position, scanning of the sheet to read its image is performed by the scanning system 10. When the reading of said image is completed, the sheet of the original document is sent to the left by means of the original document conveyor belt 506, the direction of conveyance is changed by the turning roller 507, and after passing above the switching claw 508, the sheet of the original paper is ejected to the eject paper tray 511.

In the case of a two-sided original document, when the reading operation for the first side is completed, the original document is sent to the left by the original document conveyor belt 506, and then after the original document is flipped over by the turning roller 507, the left end of the switching claw 508 moves upward such that the original document will be sent onto the platen glass 19 once more. When the original document conveyor belt 506 travels backward, the second side (the rear side) of the original document is set to the reading position. When the reading of the second side is completed, the original document is sent to the left by the original document conveyor belt 506 and is ejected onto the eject paper tray 511 via the turning roller 507, the switching claw 508 and the eject roller 509.

The paper resupply unit 600 is set on the side of the printer 3 as an additional device to automate two-sided copying. It houses the paper ejected from the copying machine 1 by means of the eject roller 87 and returns it to the printer 3 by performing a switch-back conveyance.

In the one-sided copy mode, the paper is ejected onto the eject paper tray 621 passing through the paper resupply unit 600. On the other hand, in the two-sided copy mode, the left end of the switching claw 601 is moved upward by means of a solenoid not shown in the drawing, and the paper ejected by the eject roller 87 passes through the conveyance roller 602 and reaches the direct turning roller 603. When the trailing edge of the paper reaches the paper sensor 604, the direct turning roller 603 begins backward rotation. The paper is sent back to the printer 3 by means of this operation. The returned paper is conveyed to the timing roller 84 via the horizontal conveyance rollers 88a, 88b and 88c and stands by at that location. Where multiple sheets of paper are continuously supplied, they are sequentially conveyed to the paper resupply unit 600 at certain intervals such that they will not overlap. Since the length of the paper conveyance path is unchanged, the number of sheets traveling in one cycle from the paper resupply unit 600 to the horizontal conveyance rollers 88a through 88c (the maximum number of cycling sheets) depends on the paper size.

Figure 2:
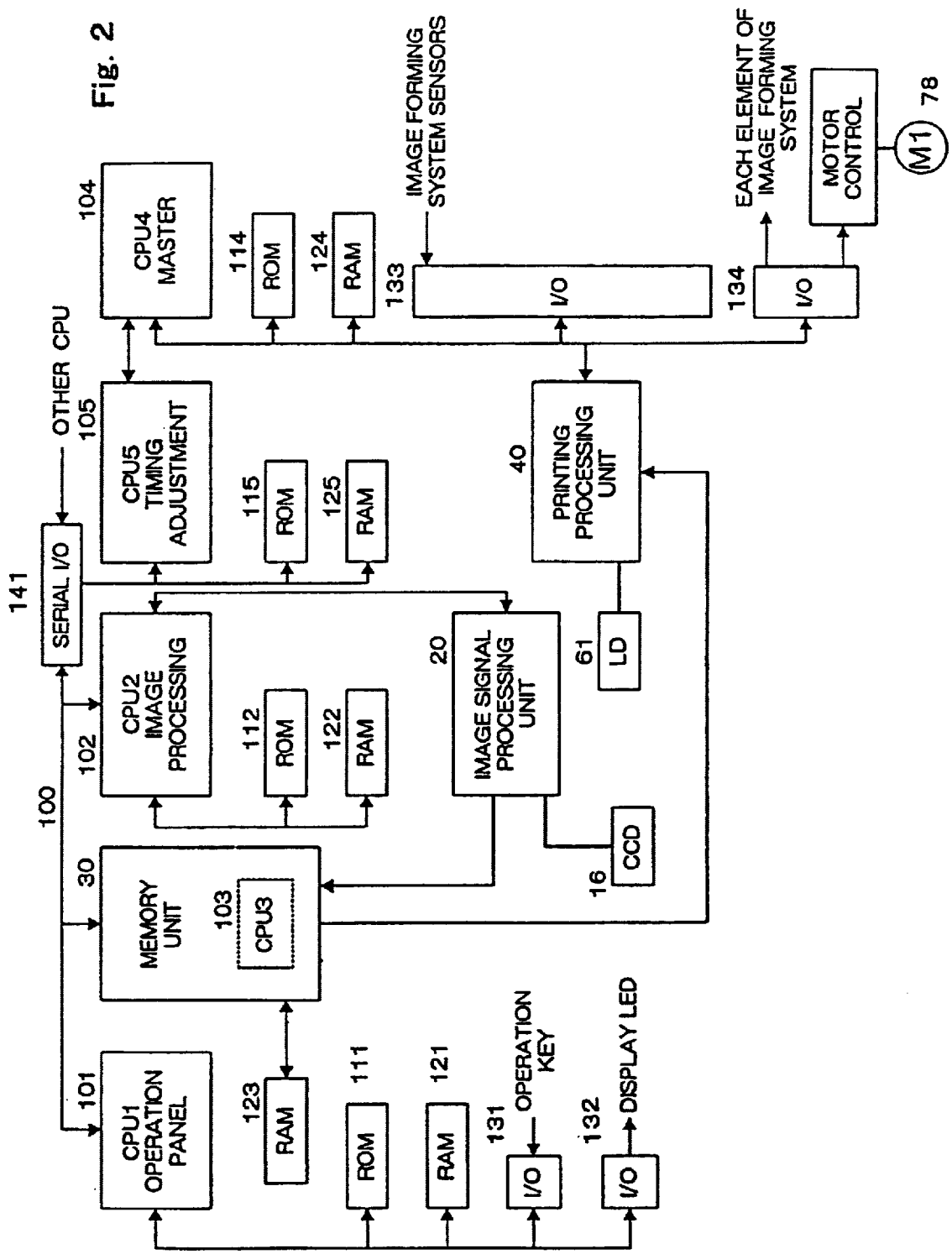
FIG. 2 is a block diagram showing the construction of a controller 100 of the copying machine 1.
Figure 3:
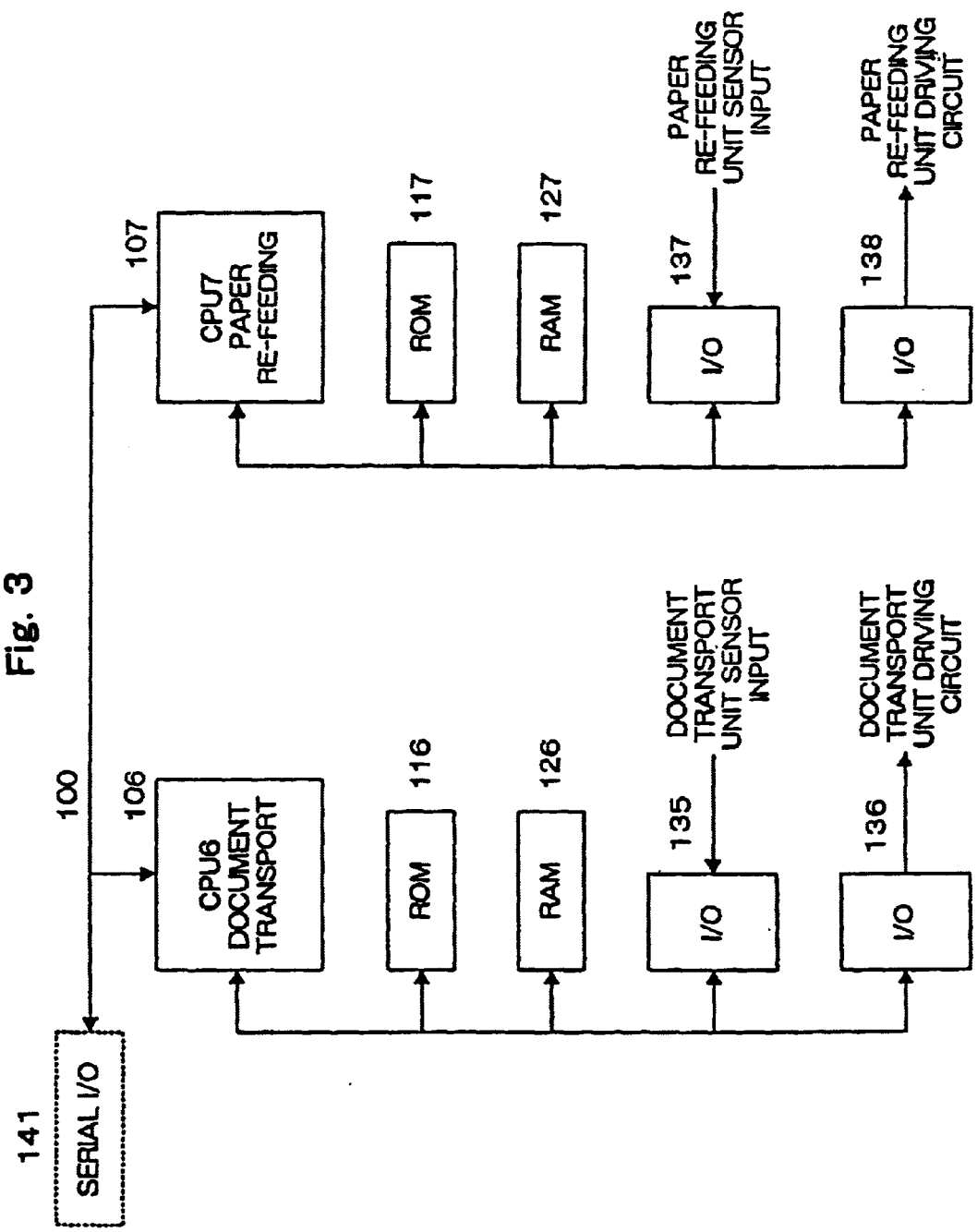
FIG. 3 is a block diagram showing the construction of the controller 100 of the copying machine 1.

FIGS. 2 and 3 are block diagrams showing the construction of the controller 100 of the copying machine 1. The controller 100 includes CPUs (central processing units) 1 through 7 (101 through 107), ROMs (read-only memories) 111 through 117 in which programs are stored, RAMs (random access memories) 121 through 127 used for work areas, I/Os 131 through 138 to control various sensors and driving circuits, and a serial I/O 141. The CPU 3 (103) is located inside the memory unit 30.

The CPU 1 (101) performs control for the input of signals from various operation keys on the operation panel as well as control for display. The CPU 2 (102) performs control of the components of the image signal processor 20 and the driving of the scanning system 10. The CPU 4 (104) performs control of the print processor 40, the laser optical system 60, the image forming system 70, and the main motor 78. The CPU 5 (105) performs overall timing adjustment for the controller 100 and processing for the setting of operation modes.

The CPU 3 (103) controls the memory unit 30 and stores the image data read in the image memory 304 described below. It then reads it out and sends it to the print processor 40.

The signals from the paper size detecting sensors 89a and 89b are input to the I/O 133. The size of the copy paper is managed by the CPU 4 (104) reading this data. The CPU 6 (106) performs control of the conveyance of original documents by the original document feeder 500. The CPU 7 (107) performs control of the paper resupply unit 600.

Figure 4:
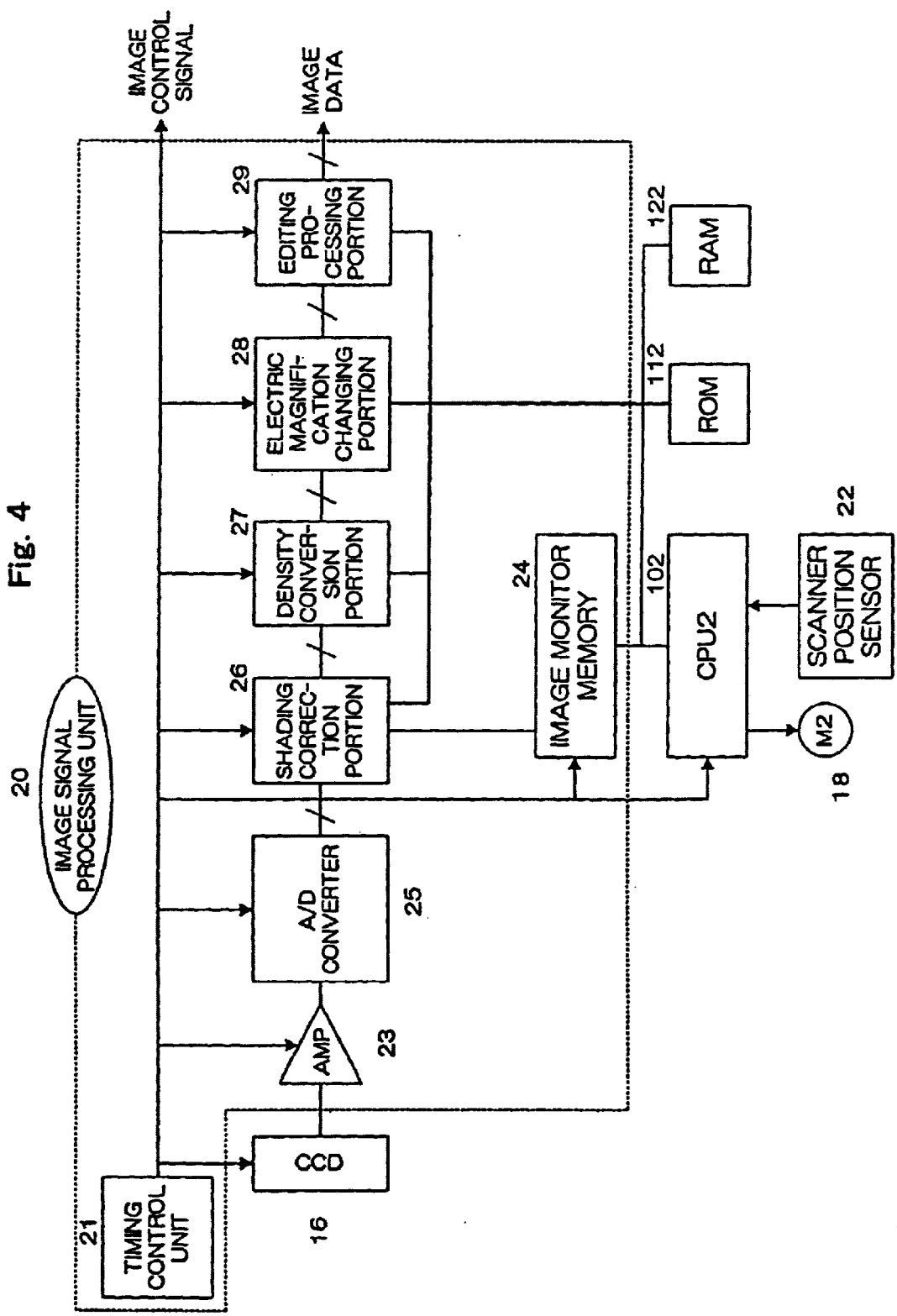
FIG. 4 is a block diagram showing the construction of a reading unit 2.

The reading unit 2 and the image signal processor 20 will be explained below. FIG. 4 is a block diagram showing the construction of the reading unit 2. The reading unit 2 includes a CCD (charge coupled device) 16, a scan motor 18, a timing controller 21 for synchronization of image reading, a scanner position sensor 22 to detect the positions of the first scanner 11 and the second scanner 14, an amplifier 23, an image monitor memory 24, an A/D converter 25, a shading corrector 26, a density converter 27, an electric magnifier 28, an editor 29, the CPU 2 (102), the ROM 112 and the RAM 122.

Image reading synchronization signals are supplied by the timing controller 21 to various components. The CCD 16 performs photoelectric conversion of the image information from the original document and outputs electric signals. The electric signals are amplified by the amplifier 23 and are converted into 8-bit digital signals by the A/D converter 25. The signals from the A/D converter 25 are processed by the shading corrector 26 such that distortion caused by the optical system and the CCD will be eliminated. The reflection data from the original document is then converted into density data by the density converter 27 and is processed for gamma correction. The signals from the density converter 27 are input to the electric magnifier 28, where electric magnification processing is performed with regard to the main scanning directions based on the magnification information set. Image editing is performed by the editor 29, and the processed image data is supplied to the print processor 40 and the memory unit 30.

The image monitor memory 24 stores image data for one line in accordance with an instruction from the CPU 2 (102). The CPU 2 (102) performs overall control of the reading unit 2, including the setting of parameters in the shading corrector 26, the density converter 27, the electric magnifier 28 and the editor 29, as well as control of the scanning through the driving of the scanner motor 18 and the communication with the host CPU 5 (105).

The method of detecting the original document size and the orientation of the original document placement will now be explained. Because the platen cover that covers the top side of the original document is formed of a material having a low reflectance, the area that reflects a large amount of light when the original document is scanned is determined to be the area of the original document. Therefore, since there is little light reflection from areas where the original document is not present, the area of the original document may be determined even when scanning is performed with the platen cover open.

The CPU 2 (102) performs preliminary scanning when it receives an instruction from the host CPU 5 (105) via the serial I/O 141 to perform the operation to detect the original document size. The CPU 2 (102) controls the scanner motor 18 based on the scanner position information from the scanner position sensor 22, and causes the scanners 11 and 14 to scan in the secondary scanning directions. The contents of the image data are read in synchronization with the secondary scanning, and the original document size and the orientation (landscape or portrait) are detected from said contents and from the scanner position information. The detected position is then sent to the host CPU 5 (105) through the serial I/O 141. The CPU 2 (102) also performs control of the speed of the scan motor 18 during image reading using the scanner speed appropriate to the magnification information, based on the magnification information sent from the host CPU 5 (105).

Figure 5:
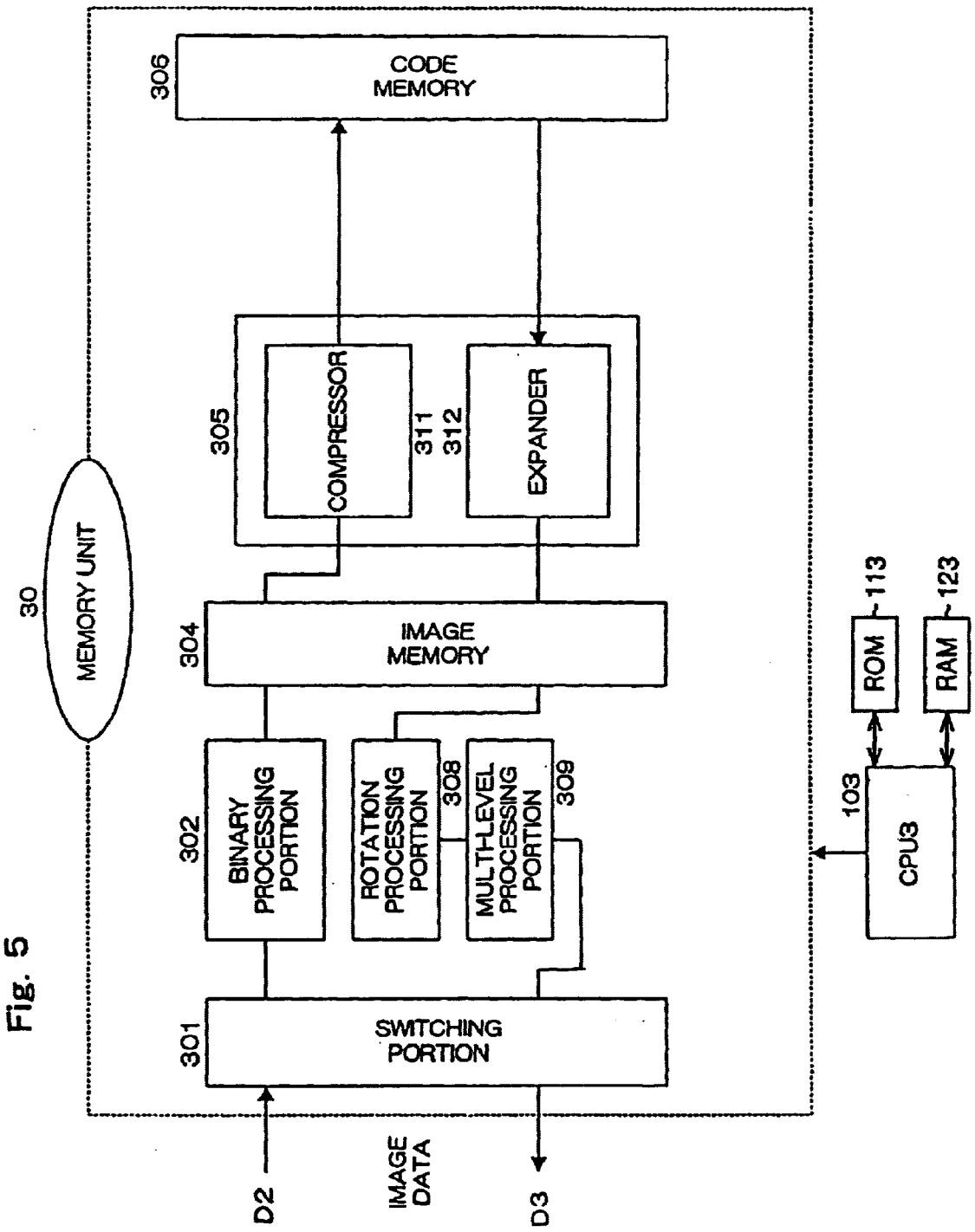
FIG. 5 is a block diagram showing the construction of a memory unit 30.

FIG. 5 is a block diagram showing the construction of the memory unit 30. The memory unit 30 includes the CPU 3 (103), a bus switching unit 301 to switch the buses to the image signal processor 20 and the print processor 40, a binary processor 302 to prepare binary data based on the parameter settings by the CPU 3 (103), a multi-port image memory 304 having the capacity to handle image data for two 400 dpi A4-size pages, a signal processor 305 that includes a compressor 311 and an expander 312 that can operate independently of each other, a multi-port code memory 306, a rotation processor 308, a multi-value processor 309 to prepare multi-value data based on the parameter settings by the CPU 3 (103), the ROM 113, and the RAM 123.

The image data read through the scanning of the original document is input from the image signal processor 20 via the bus switching unit 301 as 8-bit image data D2. The binary processor 302 converts the input 8-bit image data D2 into binary image data in the recoverable range using dithering, for example. The binarized image data is written in the image memory 304.

When the image data is written in the image memory 304, the code processor 305 prepares coded data by reading and compressing the image data, and writes this data in the code memory 306. It then reads the code data written in the code memory 306 in accordance with an instruction from the CPU 3 (103), expands it to prepare image data, and writes this image data in the image memory 304.

When image data for one page is created in the image memory 304 through expansion, the CPU 3 (103) reads the image data from the image memory 304 and outputs it to the rotation processor 308. The rotation processor 308 performs rotation processing on the image data if necessary, and outputs it to the multi-level processor 309. The multi-level processor 309 converts the binary image data into multi-level image data and outputs it to the bus switching unit 301. The bus switching unit 301 outputs the image data output from the multi-level processor 309 to the print processor 40 as image data D3 by switching the buses. The compressor 311 and the expander 312 can operate in a parallel fashion independently of each other. The data transfer among the compressor 311, the expander 312 and the code memory 306 is carried out via DMA (direct memory access) transfer.

FIG. 6(a), 6(b) is a drawing showing the relationship between the management table MT1 and the code memory 306. Job registration and printing are managed based on this management table MT1 and the code memory 306. Job registration here means the storing of one or multiple original images input together with the operation modes and the setting of them in the queue for output such as printing. The registered jobs are output, i.e., printed, for example, in a certain order (the order of registration, for example). An example in which the jobs are printed is shown in the explanation below pertaining to this embodiment.

The code memory 306 is divided into 32-kilobyte memory areas. Code data for a page is stored in each area such that writing (during the reading operation) and reading (during the printing operation) may be simultaneously controlled.

The management table MT1 is stored in the RAM 123. Stored in the management table MT1 are the number that indicates the area in the code memory 306, the job number JN for the image data, which is provided in the order of writing (in the order in which the jobs are input), the page number PN for the image data, which is provided in the order of writing (the order of the scanning of the sheets of the original document in each job), the number of the associated area, various information necessary for the compression and expansion processes such as the method of compression and the data size, and additional information comprising the copy modes set for each job (data such as the magnification, the number of copies and the need for collation). The code memory 306 is automatically managed based on said information.

The 'front connection' in FIG. 6(a) indicates the relationship to the previous 32-kilobyte area for page data. Where it is '00', it means that the area is the first storage area for one-page data. The 'rear connection' indicates the relation to the next 32-kilobyte area for page data. Where it is 'FF', it means that the area is the last area. As shown in FIG. 6(b), compressed data for each page of a job is stored in units of 32-kilobytes.

When the compressor 311 reads image data from the image memory 304 and compresses it, the CPU 3 (103) controls the compressor 311 with reference to the information in the management table MT1. The code data codified by the compressor 311 is stored in the code memory 306. When image data is generated from the code data, the CPU 3 (103) controls the expander 312 with reference to the information in the management table MT1. It then sequentially expands and reads the code data from the code memory 306. The information in the management table MT1 is deleted when the image information for that page is properly read by the expander 312 and copying of the number of copies specified by the operator has been completed.

Figure 7:
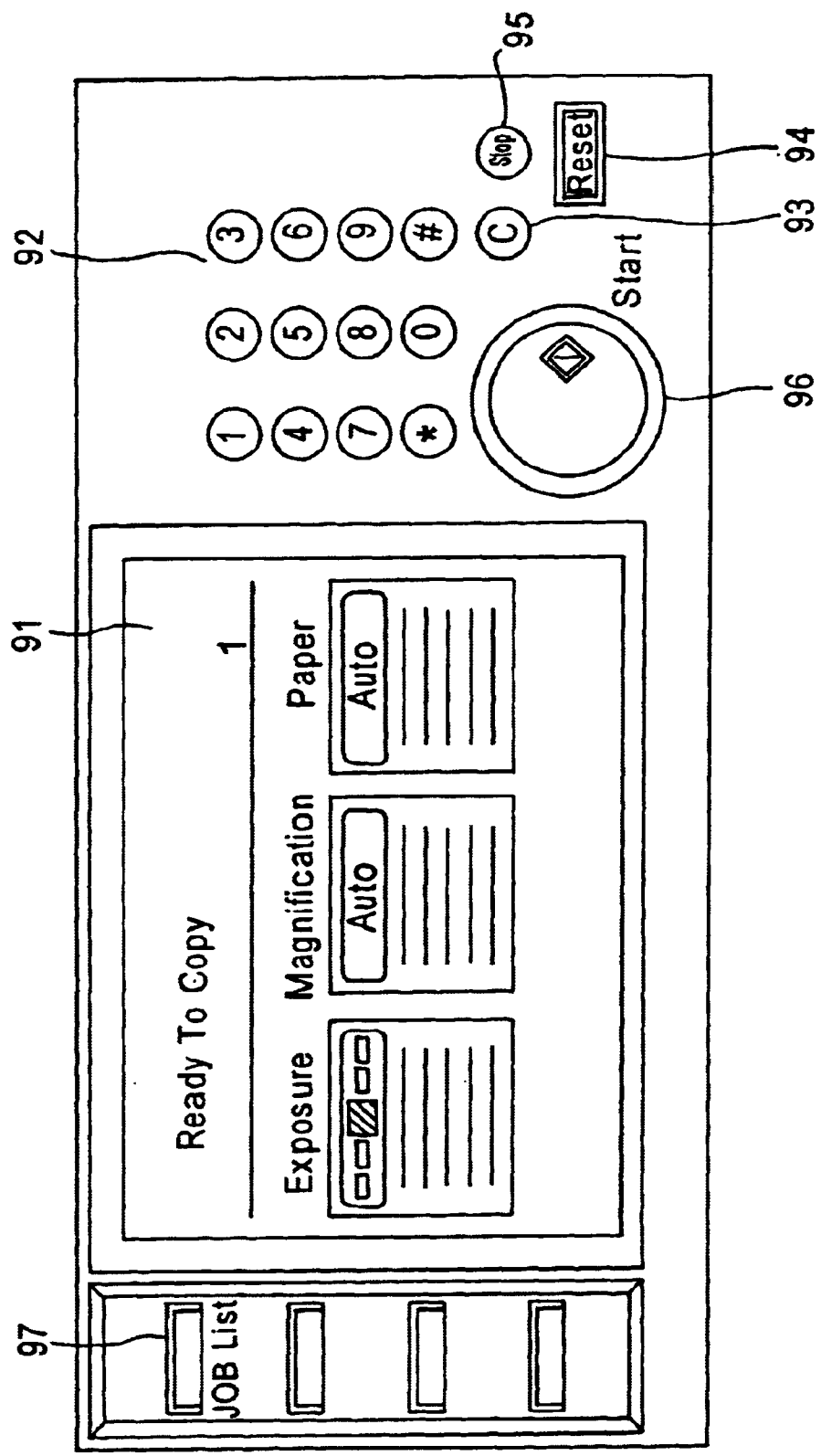
FIG. 7 is a drawing showing a liquid crystal touch panel 91 displaying the basic screen.

FIG. 7 is a plan view of the operation panel. On the operation panel are located a liquid crystal touch panel 91 to display the status and to set various modes, a numeric keypad 92 to input the numerical copying conditions (the number of copies and the magnification), a clear key 93 to return the numerical settings to their default values, a panel reset key 94 to initialize the copy modes, a stop key 95 to instruct discontinuation of the copying operation, a start key 96 to instruct the commencement of copying and the commencement of reading of the image of the original document, and a job list key 97 to display registered jobs on the liquid crystal touch panel 91. The liquid crystal touch panel 91 in FIG. 7 is displaying, as the initial screen, the 'exposure', 'magnification' and 'paper' setting screen. It is also displaying a message 'copying permitted'.

Figure 8:
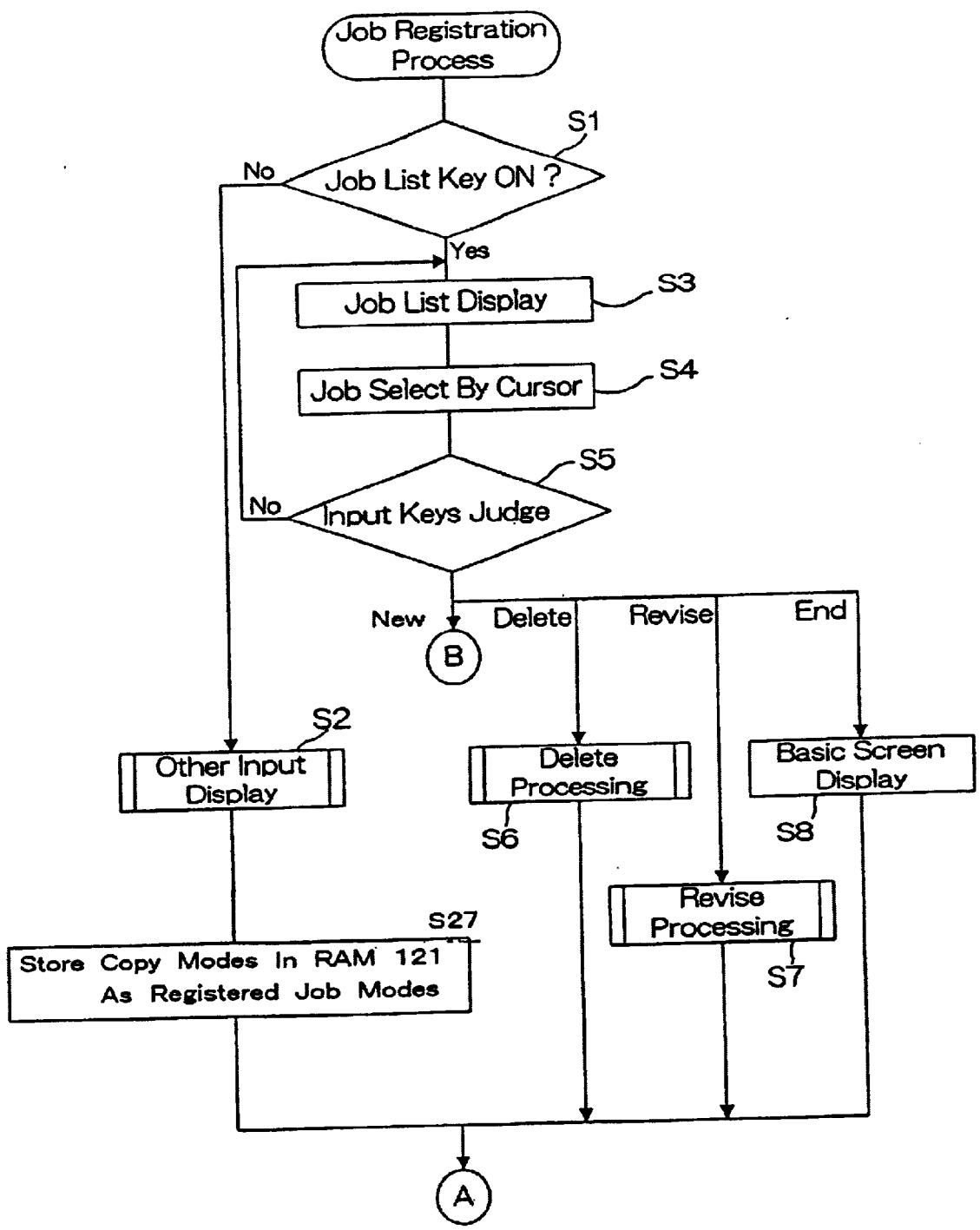
FIG. 8 is a flow chart showing the processing sequence of the copying machine of the embodiment of the present invention.
Figure 9:
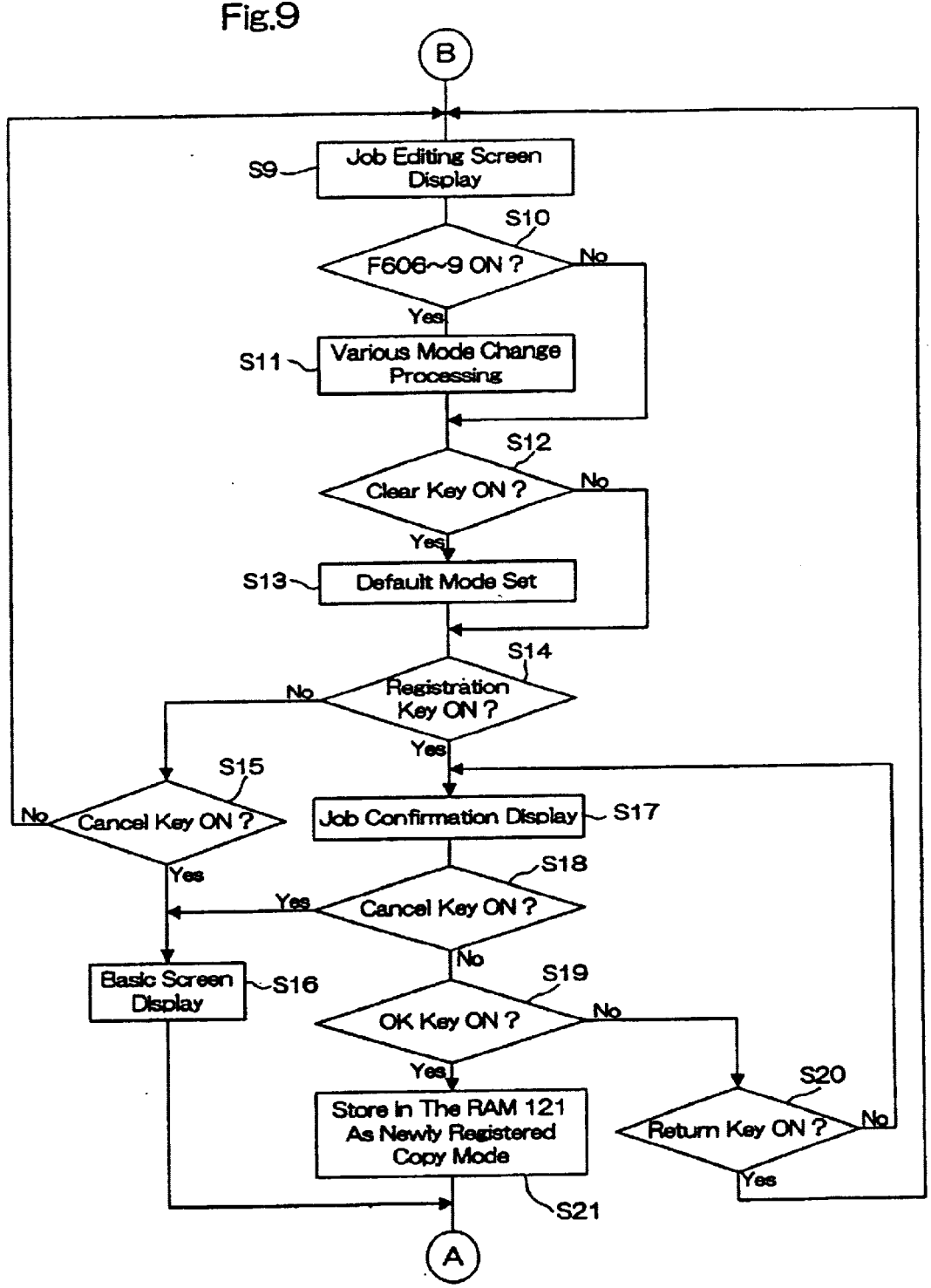
FIG. 9 is a flow chart showing the processing sequence of the copying machine of the embodiment of the present invention.
Figure 10:
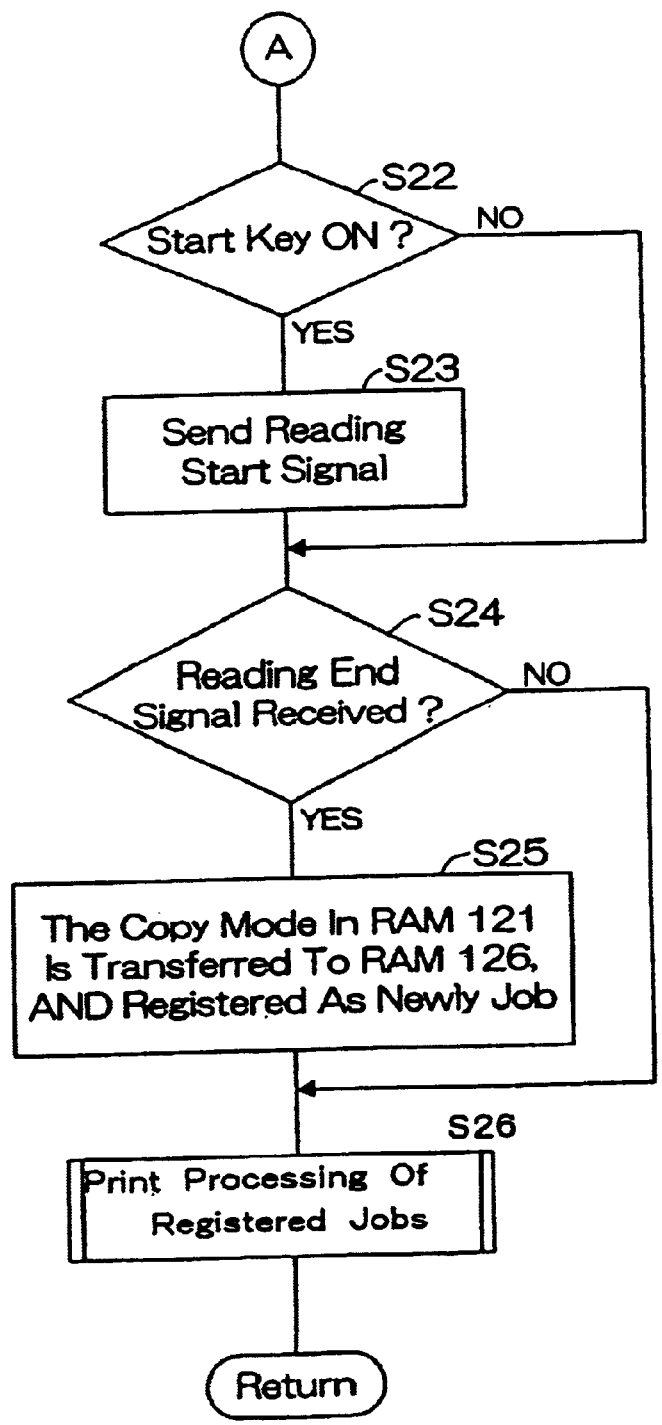
FIG. 10 is a flow chart showing the processing sequence of the copying machine of the embodiment of the present invention.

FIGS. 8, 9 and 10 are flow charts showing the processing sequence of the copying machine of this embodiment. The processes shown in these FIGS. 8, 9 and 10 are performed mainly by the CPU 1 (101). The copying machine of this embodiment has a first registration method in which copy modes such as the number of copies, magnification, copy darkness and need for collation are set using the software keys displayed on the liquid crystal touch panel 91 in the same way as in conventional copying machines to register a job, and a second registration method comprising the characteristic function of the present invention, in which a desired job is selected from the job list displayed on the liquid crystal panel 91 when the job list key 97 is pressed, the copy modes and image of the selected job are revised, and the revised job is registered as a new job, or the selected job is registered as a new job without undergoing revision. The job registration methods will be explained below.

First, it is determined whether or not the job list key 97 has been pressed (S1). Where it has not been pressed (NO in S1), other input and display processes (setting of copy modes using the first registration method) are carried out (S2), and the CPU 1 proceeds to step S27.

In step S27, the copy modes (operation modes) input in step S2 are stored in the RAM 121 as the registered job modes.

It is then determined, as shown in FIG. 10, whether or not the start key 96 has been pressed. Where it has been pressed (YES in S22), the CPU 1 (101) sends signals instructing the memory unit 30 and the CPU 2 (102) that performs control of the image processing (S23) to commence reading of the image, whereupon reading of the image begins and the image signals thus read are codified and stored in the code memory 306.

It is determined in step S24 whether or not a signal indicating the completion of the reading has been received from the CPU 2. If the signal has not been received (No in S24), the CPU 1 returns to the main routine. Where it is determined in step S24 that a signal indicating the completion of reading has been received (YES in S24), the copy mode information stored in the RAM 121 is transferred via the CPU 3 (103) to the RAM 123, where the information is associated with the image read and stored in the code memory 306 and they are registered together in the management table MT1 (S25) as a new job. Through these steps, the registration of a job using the first registration method is completed.

In step S26, printing of this job is executed when it is the job's turn to be printed.

The registration of a new job using the second registration method will now be explained.

Where it is determined in step S1 that the job list key 97 has been pressed (YES in S1), the list of jobs currently registered is displayed on the liquid crystal touch panel 91 as shown in FIG. 8 (S3). This routine is carried out by (i) the CPU 3 (103) in the memory unit 30 reading the settings for each job from the management table MT1 stored in the RAM 123 and (ii) the CPU 1 (101) receiving the settings thus read and displaying them on the liquid crystal touch panel 91.

Figure 11:
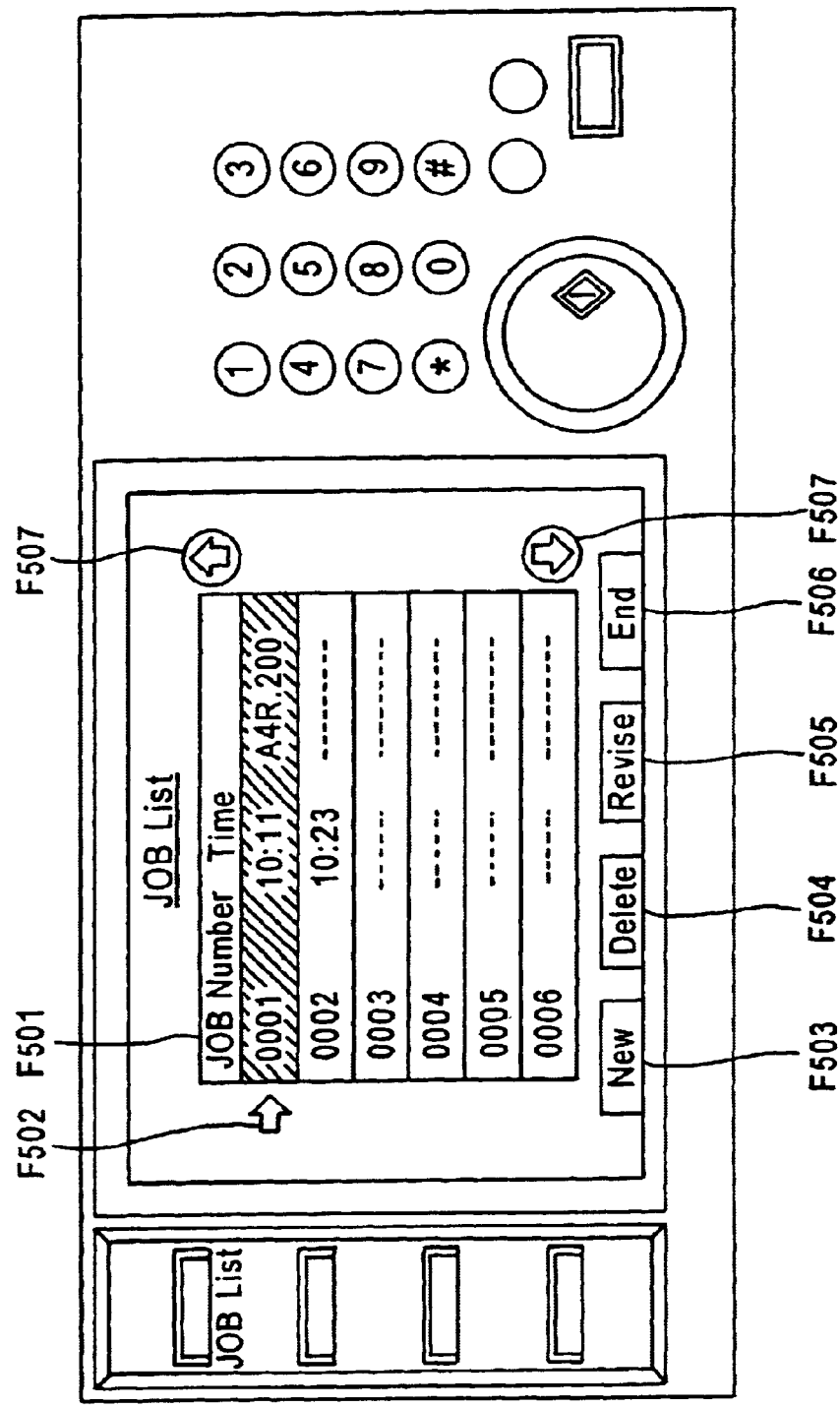
FIG. 11 is a drawing showing the liquid crystal touch panel 91 displaying the job list screen.

As shown in FIG. 11, the job numbers, time of registration and the copy modes (F501) of the jobs that are already registered are displayed on the liquid crystal touch panel 91. The cursor F502 is pointing to the job to be selected from among these jobs, and the contents of that job are highlighted. The cursor keys F507 are software keys used to scroll within the screen when the list of jobs cannot be contained in the screen or to move the highlight from one job comprising the selected object to another. When the cursor F502 reaches the bottom of the screen and there are more jobs registered, the screen is scrolled upward and more jobs are newly displayed on the screen.

The software keys shown at the bottom of the screen of the liquid crystal touch panel 91 consist of a new registration key F503, a delete key F504, a revise key F505 and an end key F506. The new registration key F503 is pressed when the selected job is registered as a new job with or without revision. The delete key F504 is pressed when a job that is already registered is to be deleted. The revise key F505 is pressed to revise the contents of a job that is registered but has not been processed. When the revise key F505 is operated, the copy modes of a registered job are revised but registration of a new job does not take place. The end key F506 is pressed when returning to the original screen from this job editing mode.

Figure 12:
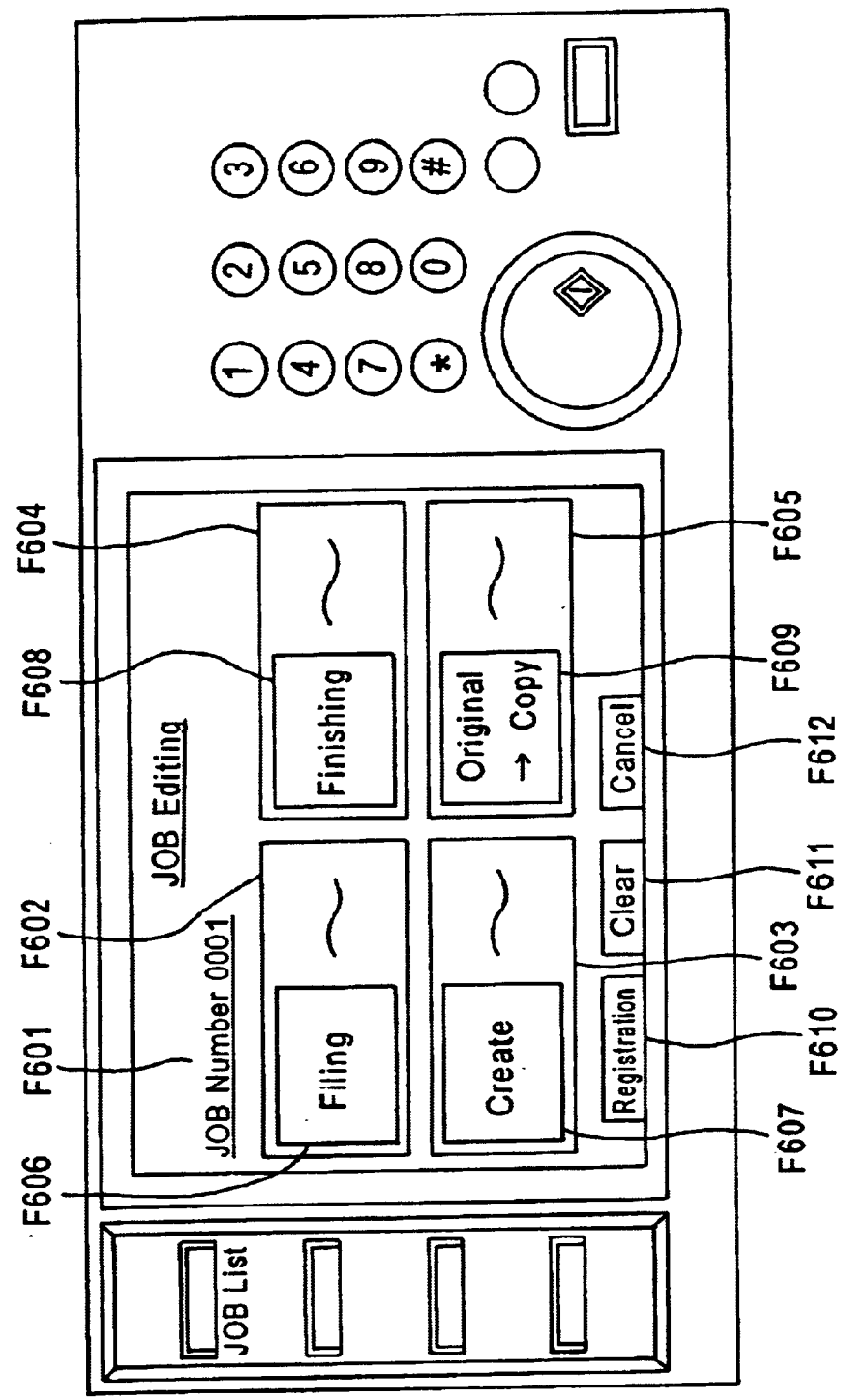
FIG. 12 is a drawing showing the liquid crystal touch panel 91 displaying the job editing screen.

With reference to FIG. 8 once more, a job is selected by means of the cursor F502 (S4), and it is determined whether or not any of the input keys (software keys) has been pressed (S5). Where none of the input keys has been pressed (NO in S5), the CPU 1 returns to step S3 and repeats the same routine.

Where it is determined in step S5 that the delete key F504 has been pressed, the job indicated by the cursor F502 is deleted (S6), and the CPU 1 proceeds to step S22.

Where it is determined in step S5 that the revise key F505 has been pressed, the screen changes to another screen in which the contents of the job, which is registered but has not been processed, indicated by the cursor F502, is revised (S7). When the revision of the job contents is completed, the CPU 1 proceeds to step S22.

Where it is determined in step S5 that the end key F506 has been pressed, the basic screen shown in FIG. 7 is displayed (S8) and the CPU 1 proceeds to step S22.

Where it is determined in step S5 that the new registration key F503 has been pressed, the job editing screen shown in FIG. 12 is displayed (FIG. 9, S9). When this is done, the copy modes of the job indicated by the cursor F502 in FIG. 11 are read from the RAM 123 via the CPU 3 (103). The job number of the job thus read is displayed in F601, and the copy modes of said job are displayed in F602 through F605, respectively.

The software keys F606 through F609 are software keys to move to various setting screens when the recalled copy modes are revised. When any of the software keys F606 through F609 are pressed, changes in the job copy mode settings equivalent to 'filing', 'create', 'finish' or 'original→copy' become possible.

Specifically, examples of copy mode (operation mode) setting changes include a change in magnification, a change in the number of copies, a change in the copy paper size, whether to set the N in 1 mode in which multiple images are printed on one sheet of paper, alternation between two-sided copying and one-sided copy, whether to set a cover page mode, whether to set a binding margin, and whether to set sort mode.

The registration key F610 in FIG. 12 is a software key to move to the screen in which, after the revision of the copy modes of a job is completed in the job editing screen, it is confirmed whether to register the revised copy modes as a new job. The clear key F611 is a software key to clear all of the various settings displayed on the screen or to return the settings to the default values incorporated in the copying machine. The cancel key F612 is a software key to exit this job editing mode and return to the original screen display.

It is determined in step S10 whether any of the software keys F606 through F609 has been pressed. If none of the software keys has been pressed (NO in S10), the CPU 1 proceeds to step S12. If any of the software keys has been pressed (YES in S10), one various mode change routines corresponding to the software key that was pressed is carried out (S11).

Where the clear key F611 is pressed (Yes in S12), various settings are returned to their default values (S13), whereupon the CPU 1 proceeds to step S14. If the clear key F611 is not pressed, the CPU 1 proceeds to step S14 without any processing.

Figure 13:
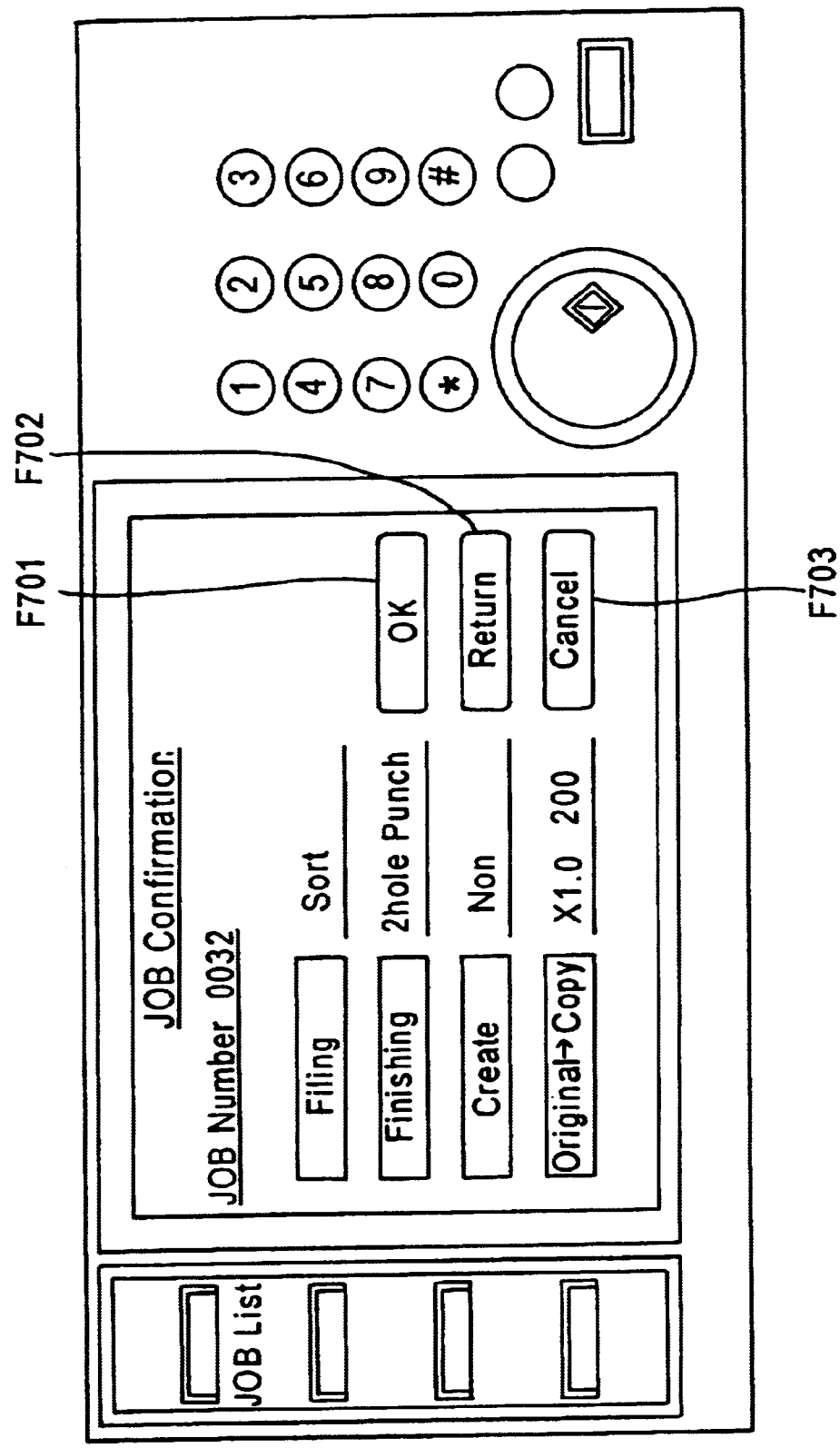
FIG. 13 is a drawing showing the liquid crystal touch panel 91 displaying the confirmation screen.

It is determined in step S14 whether or not the registration key F610 has been pressed. If it has not been pressed (No in S14), it is determined whether or not the cancel key F612 has been pressed (S15). If it has not been pressed (No in S15), the CPU 1 returns to step S9 and repeats the same routine described above. If the cancel key F612 has been pressed (Yes in S15), the basic screen shown in FIG. 7 is displayed (S16), whereupon the CPU 1 proceeds to step S22.

Where it is determined in step S14 that the registration key F610 has been pressed (Yes in S14), the job confirmation screen shown in FIG. 13 is displayed (S17). As shown in FIG. 13, the set values and set functions are displayed for 'filing', 'finish', 'create' and 'original→ copy'. On the right hand side of the liquid crystal touch panel 91 are shown an OK key F701, a return key F702 and a cancel key F703, all of which are software keys.

Where it is determined in step S18 whether or not the cancel key F703 has been pressed, and where it has been pressed (YES in S18), the CPU 1 proceeds to step S16, in which the basic screen shown in FIG. 7 is displayed. Where the cancel key F703 has not been pressed (NO in S18), it is determined whether the OK key F701 has been pressed.

Where it is determined in step S19 that the OK key F701 has not been pressed (NO in S19), it is determined whether the return key F702 has been pressed (S20). Where the return key F702 has not been pressed (NO in S20), the CPU 1 returns to step S17, in which it repeats the same routine described above. Where the return key F702 has been pressed (YES in S20), the CPU 1 returns to step S9, in which it repeats the same routine described above.

Where it is determined in step S19 that the OK key F701 has been pressed (YES in S19), the current copy modes are stored in the RAM 121 as newly registered job modes (S21). The copy modes of a selected job are partially revised and newly registered job modes are set in this way. If the copy modes of the selected job are not revised, the same copy modes as those of the selected job are set as newly registered copy modes.

It is then determined whether the start key 96 has been pressed, as shown in FIG. 10, and where it has been pressed (YES in S22), the CPU 1 (104) sends signals instructing memory unit 30 and the CPU 2 (102) that performs control of image processing (S23) to begin of image reading. Image reading then begins, and the image signals that are read are codified and stored in the code memory 306.

It is determined in step S24 whether a signal indicating the completion of the reading has been received from the CPU 2, and if it has not been received (NO in S24), the CPU 1 returns to the main routine. Where it is determined in step S24 that a signal has been received indicating that the reading was completed (YES in S24), the copy mode information stored in the RAM 121 is transferred to the RAM 123 via the CPU 3 (103). The copy mode information is then associated with the image data read and stored in the code memory 306, and they are registered together in the management table MT1 (S25) as a new job. This completes the job registration process using the second registration method.

Where the start key 96 is pressed without the placement of a new original document, the image data of the job selected in step S4 is used as the image data for the newly registered job.

When the turn for the registered job arrives, printing is executed for this job in step S26.

As explained above, using the image forming apparatus of this embodiment, a new job is registered using a job that is already registered, and where the same copy modes are used, the registered job may be re-registered as a new job as is. Where a similar job exists as registered, a job that the user desires may be registered by partially revising the copy modes of the registered job, which reduces the time required for job registration and eliminates the need for the mode selection operation.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. An image forming apparatus, comprising:

input means for inputting image data;

first registering means for associating operation modes with said image data and registering them together as a job;

selecting means for selecting a job from among the jobs registered by said first registering means;

revising means for revising the selected job;

second registering means for registering said revised job as a new job; and output means for executing output of the jobs registered by said first registering means and said second registering means.

2. An image forming apparatus as claimed in claim 1, wherein said revising means revises the operation modes of the Job selected by the selecting means.

3. An image forming apparatus as claimed in claim 1, wherein said revising means replaces the image data of the job selected by selecting means with image data that is newly input.

4. An image forming apparatus as claimed in claim 1, further comprising:

display means for displaying the operation modes of the Job selected by the selecting means.

5. An image forming apparatus as claimed in claim 4, wherein said display means displays a mode list of all registered jobs.

6. An image forming apparatus as claimed in claim 1, wherein said input means includes an image reader which reads image data of original documents.

7. An image forming apparatus as claimed in claim 1, wherein said output means includes a printer which performs images on sheets based on the image data.

8. An image forming apparatus as claimed in claim 1, wherein said revising means revises the selected job by an operation of an operator.

9. An image forming apparatus, comprising:

input means for inputting image data;

first registering means for associating operation modes with said image data and registering them together as a job;

selecting means for selecting a job from among the jobs registered by said first registering means;

second registering means for registering the selected job as a new job; and output means for executing output of the jobs registered by said first registering means and said second registering means.

10. An image forming apparatus as claimed in claim 9, further comprising:

display means for displaying the operation modes of the Job selected by the selecting means.

11. An image forming apparatus as claimed in claim 10, wherein said display means displays a mode list of all registered jobs.

12. An image forming apparatus as claimed in claim 9, wherein said input means includes an image reader which reads image data of original documents.

13. An image forming apparatus as claimed in claim 9, wherein said output means includes a printer which performs images on sheets based on the image data.

14. An image forming apparatus, comprising:

reading means for reading image data of original documents;

first registering means for associating operation modes with said image data and register them together as a job;

selecting means for selecting a job from among the jobs registered by said first registering means;

display means for displaying the operation modes of the job selected by said selecting means;

revising means for revising the operation modes that are displayed;

second registering means for associating the revised operation modes with image data newly read by said reading means and registering them together as a new job; and output means for executing output of the image data of the jobs registered by said first registering means and said second registering means based on the operation modes.

15. An image forming apparatus as claimed in claim 14, wherein said display means displays a mode list of all registered jobs.

16. An image forming apparatus as claimed in claim 14, wherein said revising means revises the selected job by an operation of an operator.

17. A job registration method of an image forming apparatus, comprising the steps of:

inputting image data;

registering the image data with operation modes as a job;

selecting a job from among the jobs registered by said first registering means;

revising the selected job; and registering said revised job as a new job.

18. A job registration method of an image forming apparatus, comprising:

inputting image data;

registering said image data with operating modes as a job by a first registering means;

selecting a job from among the jobs registered by said first registering means; and registering said selected job as a new job by a second registering means.

* * * * *